May 21, 1929. T. H. THOMAS 1,714,057
ELECTROPNEUMATIC BRAKE
Filed Aug. 24, 1927 2 Sheets-Sheet 2

INVENTOR
THOMAS H. THOMAS
BY Wm. N. Cady
ATTORNEY

Patented May 21, 1929.

1,714,057

UNITED STATES PATENT OFFICE.

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

ELECTROPNEUMATIC BRAKE.

Application filed August 24, 1927. Serial No. 215,072.

This invention relates to electro-pneumatic brakes, and more particularly to an electro-pneumatic brake equipment for controlling the brakes on railway trains.

With an electro-pneumatic brake equipment in which the means for effecting an emergency application of the brakes is pneumatically initiated and in which the grounding of the train wire will only cause an application of the brakes on the cars at the rear of the point at which the train wire is grounded, it is desirable that the brakes be applied throughout the train.

One object of my invention is to provide an electro-pneumatic brake equipment of the above chaarcter, having means operative at the rear of a train for initiating a brake application throughout the train, in case the electric train wire becomes grounded.

Other objects and advantages will appear in the following more detailed description of the invention.

Figure 1:
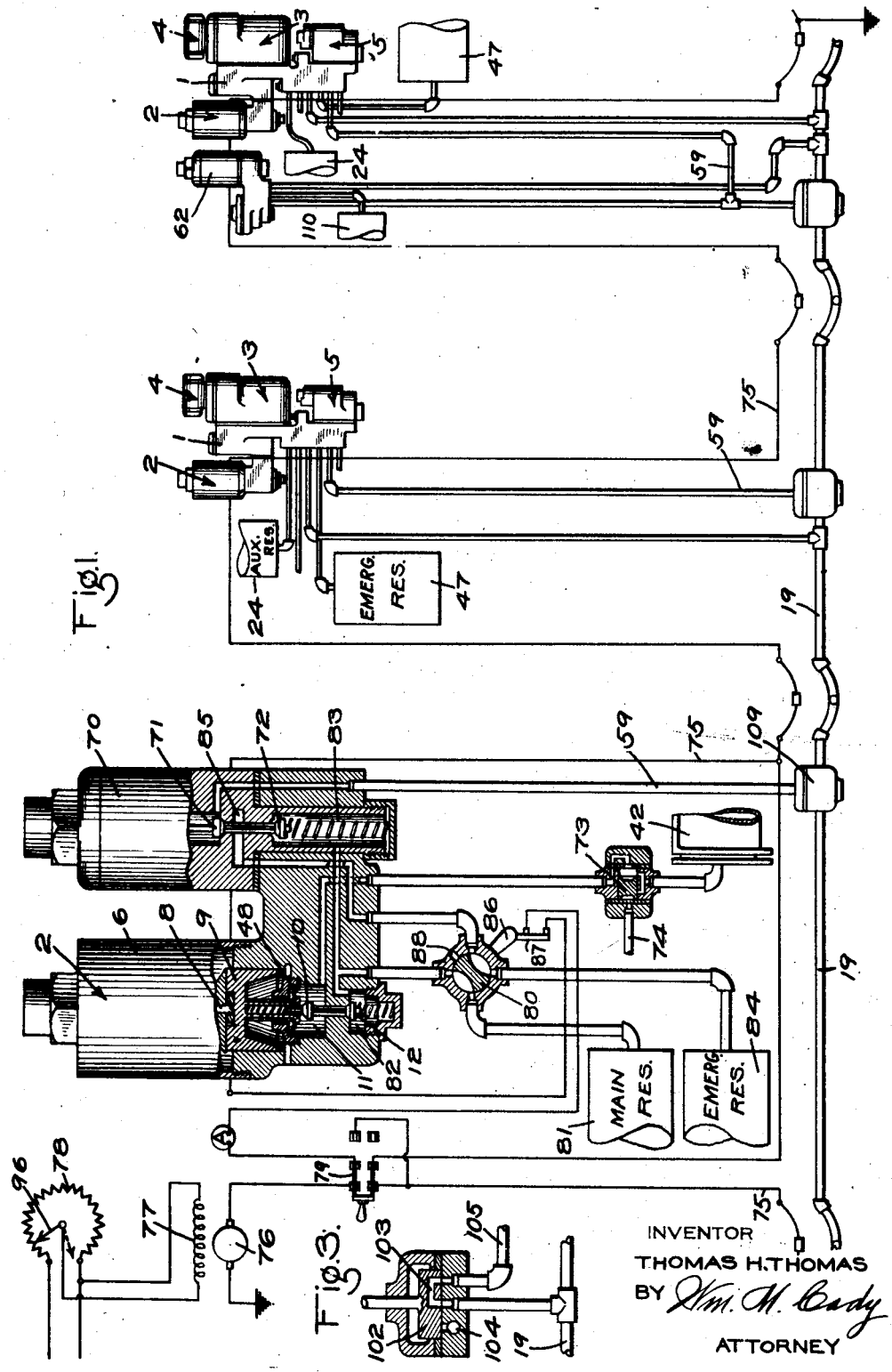
Figure 2:
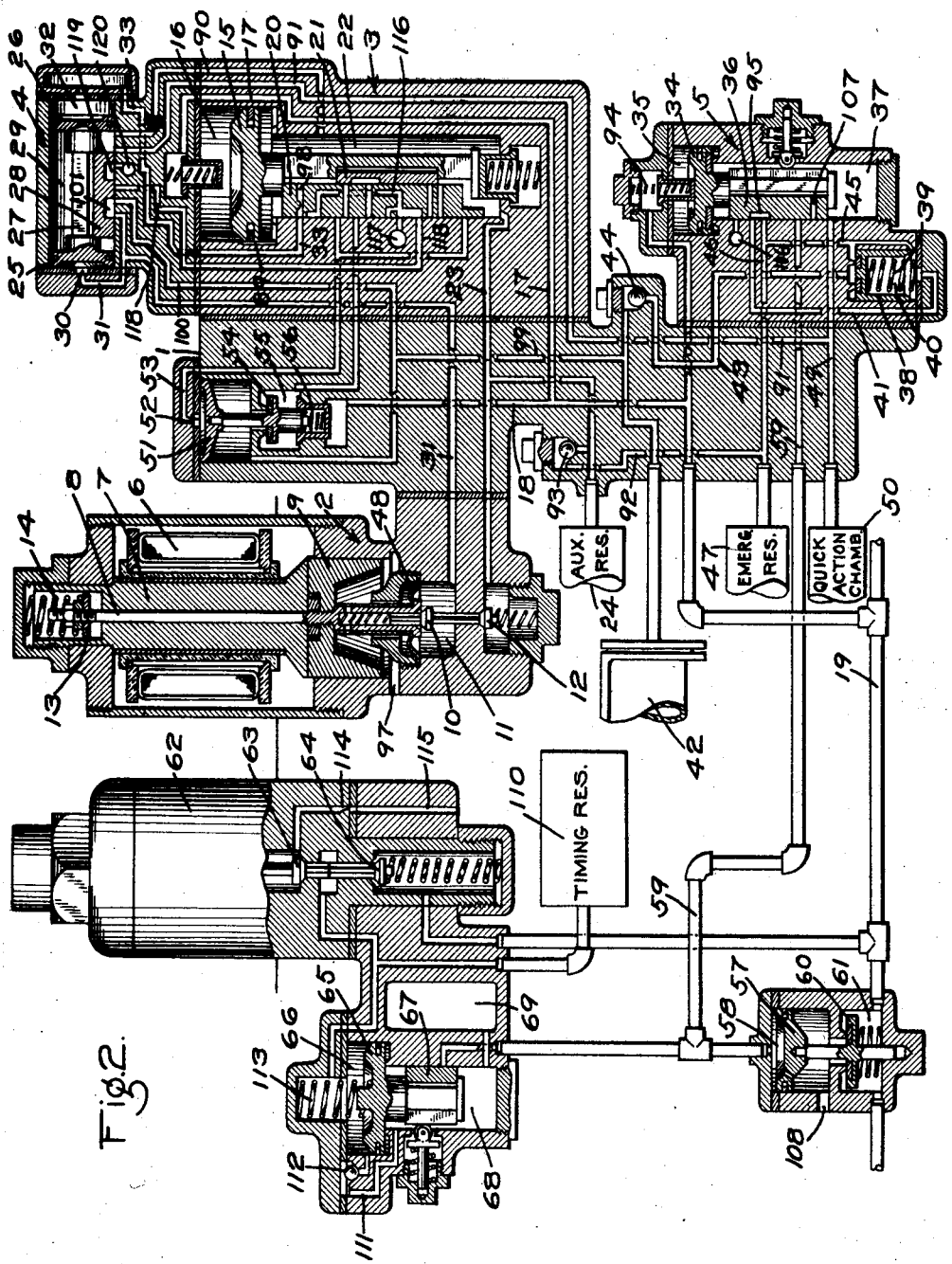

In the accompanying drawings; Fig. 1 is a diagrammatic view of an electro-pneumatic brake equipment embodying my invention; Fig. 2 a sectional view of the caboose or rear car apparatus; and Fig. 3 a detail view of the means for effecting a reduction in brake pipe pressure associated with the rheostat controller.

According to my invention, each car, including the caboose or end car, is equipped with a combined electrically controlled and pneumatically controlled valve mechanism comprising a pipe bracket 1, to which is applied a magnet valve device 2, a triple valve device 3, a change-over valve device 4, and an emergency high pressure valve device 5.

The magnet valve device 2 comprises a magnet 6, the core 7 of which is provided with a central bore in which a stem 8 is adapted to reciprocate. Secured to the lower end of the stem is an armature 9 and below the armature the stem is enlarged to provide a central bore, at the lower end of which is provided a valve seat for a valve 10. A flexible diaphragm 48 is secured to the lower end of the enlarged portion of the stem 8 and said diaphragm is subject to the pressure of fluid in chamber 11.

In alinement with the valve 10 is a valve 12, the stem of which is adapted to engage the valve 10. The upper end of the stem 8 carries a washer 13 which is subject to the pressure of a coil spring 14.

The triple valve device 3 shown is of the retarded release, quick service type, but any other type of triple valve device may be employed.

The triple valve device may comprise a piston 15 contained in a piston chamber 16, which chamber is connected through passages 17 and 18 with the brake pipe 19. The piston 15 is adapted to operate a main slide valve 20 and a graduating slide valve 21 contained in valve chamber 22, said chamber being connected, through passage 23, with an auxiliary reservoir 24.

The change-over valve device 4 may comprise pistons 25 and 26 connected by a stem 27 and adapted to operate a slide valve 28, contained in valve chamber 29, intermediate the pistons. The piston chamber 30 of piston 25 is connected to a passage 31, leading to chamber 11, and piston chamber 32 of piston 26 is connected to a passage 33, leading to the seat of slide valve 20.

The emergency high pressure valve device 5 may comprise a piston 34, contained in piston chamber 35, and a slide valve 36 adapted to be operated by said piston and contained in valve chamber 37.

The emergency valve device controls the operation of a high pressure valve which may comprise a valve piston 38, subject on its under side to the pressure of a coil spring 39, the spring chamber 40 being connected to a passage 41 leading to the seat of slide valve 20. The inner seated area of the valve piston 38 at its upper face is connected to the brake cylinder 42 through a passage 43 and past a check valve 44, while the outer seated area is connected, through passages 45 and 46, with an emergency reservoir 47. The valve chamber 37 is connected through passage 49 with a quick action chamber 50.

Embodied in the bracket 1 is a quick action valve device comprising a piston 51 contained in piston chamber 52, which chamber is connected to a passage 53 leading to the seat of slide valve 20. Said piston is adapted to operate a vent valve 54, contained in valve chamber 55, and a check valve 56 controls communication from brake pipe passage 18 to the valve chamber 55.

An additional quick action valve device is provided, which is controlled by the emergency valve device 5 and comprises a piston 57, having the piston chamber 58 at one side connected to a pipe and passage 59 leading to the seat of slide valve 36, and a vent valve 60 adapted to be operated by said piston and contained in a valve chamber 61 which is open to the brake pipe 19.

In addition to the apparatus above described as applied to each car of the train, the caboose or rear car is provided with an emergency magnet 62 adapted to operate double beat valves 63 and 64 and an emergency valve device comprising a piston 65 contained in piston chamber 66 and a slide valve 67 adapted to be operated by said piston and contained in valve chamber 68, which chamber is connected to a quick action chamber 69.

On the locomotive or head car, a magnet valve device 2 is provided, of the same construction as employed on the cars of the train and in addition, an emergency magnet valve device is provided comprising a magnet 70, and double beat valves 71 and 72 adapted to be operated by said magnet.

A double check valve 73 controls communication from chamber 11 of the magnet valve device to the brake cylinder, so that in case the electro-pneumatic brake is cut out of action, the double check valve will be operated to permit the brakes to be controlled by the usual pneumatically controlled apparatus, in which case fluid is supplied through pipe 74 and past the double check valve to the brake cylinder.

All of the magnets on the train are connected in series to a single train wire 75 and current is supplied to said wire by a generator on the locomotive, having an armature 76 with one terminal connected to the train wire 75 and the other terminal connected to ground. The field 77 of the generator is supplied with current from a separate source of current and the current flow is varied by means of a rheostat 78.

A double throw switch 79 is also provided, which normally completes a circuit from the generator through the train wire 75 both to front and at the rear of the locomotive. In the other position of the switch, the generator is cut out of the circuit, and a circuit is completed from the train wire 75 at the rear to the train wire 75 at the forward end of the locomotive.

An ammeter A is placed in the train wire circuit, so that the operator can note the amount of current flowing through the train wire.

A combined cut-out cock and switch is also provided having a cut-out cock 80 adapted in the normal position to connect the main reservoir 81 with a passage leading to the valve chambers 82 and 83. The cock also connects the emergency reservoir 84 with a passage leading to a chamber 85 intermediate the valves 71 and 72.

With the handle 86 of the cock in the position shown, a switch member 87, movable with the handle, closes the circuit through the train wire 75. When the cut-out cock handle is moved to cut out position, the passages leading to the chambers 82 and 85 are cut off from the main reservoir 81 and the emergency reservoir 84 respectively and said passages are connected to an atmospheric exhaust port 88. At the same time, the contact member 87 is moved so as to open the circuit through the train wire 75.

In operation, the brake pipe 19 being charged with fluid under pressure from the locomotive in the usual manner, fluid flows from the brake pipe through passages 18 and 17 to the piston chamber 16 of each triple valve device and the triple piston 15 being in normal release position, fluid flows through the usual feed groove 89 to the valve chamber 22 and thence through passage 23 to the auxiliary reservoir 24.

The valve chamber 29 of the change-over valve device 4 is charged from the valve chamber 22 through passage 90 and the slide valve 28 being in the position shown, fluid under pressure is supplied from valve chamber 29 through passage 91 to valve chamber 37 and also to the quick action chamber 50. The emergency reservoir 47 is charged from the auxiliary reservoir 24, through passage 92 past the check valve 93. The piston chamber 35 of the emergency valve device 5 is subject to brake pipe pressure and the valve chamber 37 being charged to the same pressure, the spring 94 maintains the piston 34 and slide valve 36 in the lower position, as shown in the drawing.

In this position, the emergency reservoir 47 is connected through passage 46, cavity 95 in slide valve 36 and passage 41 with the spring chamber 40 of the high pressure supply valve 38, and the valve 38 is held in its upper seated position.

In the release position, the controller arm 96 of the rheostat is in the position shown in the drawing, so that most of the resistance is cut out of the circuit, and the current flow through the field 77 of the generator is high, and consequently the current generated by the generator is of such strength as to cause the armature 9 of each magnet 6 to be pulled by the force of the magnet so as to overcome the opposing pressure of spring 14, permitting the valve 12 to seat, while the stem 8 is moved away from the valve 10, so that the valve 10 is unseated.

The piston chamber 30 of the change-over valve device 4 is connected to the atmosphere through passage 31 and past the unseated valve 10 to exhaust port 97, while the piston chamber 32 is supplied with fluid under pressure from the valve chamber 22 through port 98 in slide valve 20 and passage 33. The pistons 25 and 26 are therefore maintained in the left hand position, as shown in the drawings, in which the brake cylinder 42 is connected to valve chamber 11 through passage 99, passage 100, cavity 101 in slide valve 28 and passage 31. The brake cylinder 42 is therefore also connected to the exhaust port 97, so that the brakes are held released.

On the locomotive, the brake cylinder 42 is also connected to the exhaust, through the energization of magnet 6, sufficiently to effect the unseating of the valve 10.

When it is desired to effect an electric service application of the brakes, the rheostat controller handle 96 is turned so as to cut more resistance into the circuit. This reduces the current flow through the field 77 and causes a reduction in current flow from the generator to the train wire circuit.

The weakening of the force of each magnet 6 then permits the force of the spring 14 to act so as to move the stem 8 downwardly. This downward movement first causes the seat of the valve 10 to engage said valve and then further movement of the stem causes the valve 12 to be unseated. The unseating of valve 12 permits the flow of fluid under pressure from valve chamber 22 and the auxiliary reservoir 24, through passage 23 to passage 31 and thence through cavity 101 in the slide valve 28 to passage 100 and thence to the brake cylinder 42.

When the brake cylinder pressure has been increased to a predetermined degree, the pressure acting in chamber 11 on the diaphragm 48 operates to effect an upward movement of the stem 8 until the valve 12 is brought to its seat. Further flow of fluid to the brake cylinder is then cut off. The brake cylinder pressure may be increased by moving the rheostat controller handle 96 so as to introduce more resistance into the field circuit of the generator, and the force of each magnet 6 being correspondingly reduced, the magnet valve device again operates as above described to permit the further supply of fluid to the brake cylinder.

In case of leakage from the brake cylinder while the brakes are being held applied, the pressure on the diaphragm 11 being correspondingly reduced, the stem 8 will move downwardly so as to open the valve 12 and permit the supply of fluid to the brake cylinder until the brake cylinder pressure has been increased to the predetermined degree corresponding with the degree of energization of the magnets 6.

In order to release the brakes, the rheostat controller handle 96 is moved back to release position, in which the magnets 6 are sufficiently energized to cause the stem 8 of each magnet to move so as to unseat the valves 10.

In order to effect an electric emergency application of the brakes from the locomotive, the rheostat controller handle 96 is turned to emergency position, as shown in dotted lines, in which the local circuit of the generator field is opened. When the handle 96 is turned to emergency position, a rotary valve 102 is also turned so as to connect the brake pipe 19 through cavity 103 with an exhaust port 104. In other positions of the rotary valve, the cavity 103 connects the brake pipe through pipe 105 to the usual engineer's brake valve, so that the pressure in the brake pipe may be then controlled by the brake valve in the usual manner for pneumatically controlling the brakes.

The reduction in current flow through the magnets 6 causes the operation of same as in the case of an electric service application, but in addition, the venting of fluid from the brake pipe through the operation of the rotary valve 102, causes the movement of the emergency pistons 34 serially on each car of the train, the pistons being held against movement under service reductions in brake pipe pressure. When the piston 34 is shifted to its outer emergency position, cavity 95, in slide valve 36, connects passage 41 with an exhaust port 106. Fluid under pressure is thus vented from chamber 40 of the high pressure valve 38, so that said valve is shifted downwardly by the fluid pressure acting on the outer seated area thereof. Fluid under pressure is then supplied from the emergency reservoir 47 to the brake cylinder 42, through passage 43. The brake cylinder being supplied with fluid from the emergency reservoir as well as from the auxiliary reservoir by operation of the magnet device 2, a high pressure is obtained in the brake cylinder in an emergency application of the brakes.

In the emergency position of slide valve 36 a port 107 registers with passage 59, so that fluid under pressure is supplied from valve chamber 37 to piston chamber 58 of the vent valve device. The vent valve 60 is then shifted from its seat by piston 57, so as to permit the venting of fluid from the brake pipe 19 to the atmosphere, by way of port 108. A local venting of fluid from the brake pipe is thus produced, which causes the well known quick serial action throughout the train.

On the locomotive, the emergency magnet 70 is deenergized, so that the valve 72 is moved to its seat, while the valve 71 is unseated. The unseating of valve 71 permits the flow of fluid under pressure from the emergency reservoir 84 to pipe 59 to the brake pipe vent valve 109, which is of the same construction as that employed on the cars of the train. The vent valve device 109 is then operated to effect a local reduction in brake pipe pressure on the locomotive.

With the rear car or caboose equipped the same as the other cars, no emergency action would occur in case of a grounded train wire on the cars at the rear of the point where the train wire is grounded, since a sudden reduction in brake pipe pressure is required with the car equipment to produce an emergency application of the brakes.

For this reason, I provide on the caboose or rear car, an electrically controlled means for effecting an emergency application of the brakes, as shown in Fig. 2.

When the magnet 62 of said electrically controlled means is deenergized by the grounding of the train wire somewhere in the train, the valve 64 is allowed to seat, while the valve 63 is unseated. In the normal energized condition of magnet 62, the valve 63 is seated and the valve 64 unseated, so that fluid is supplied from the brake pipe 19 to piston chamber 66 and also to a timing reservoir 110. The piston chamber 66 and timing reservoir 110 are thus charged and the valve chamber 68 is also charged by way of passage 111, containing check valve 112, as well as the volume chamber 69.

The fluid pressures on opposite sides of piston 65 being equalized, the spring 113 normally maintains the piston 65 in the position shown.

When the valve 63 is unseated, however, fluid is vented from the timing reservoir 110 and from the piston chamber 66 at a slow rate, as determined by a restricted portion 114 of the atmospheric exhaust passage 115.

When the pressure in the piston chamber 66 has been reduced to a predetermined degree sufficient to permit the fluid pressure in chamber 68 to overcome the pressure of the spring 113, the piston 65 will be shifted outwardly, so that communication is opened from valve chamber 68 to piston chamber 58 of the vent valve device. Said vent valve device is then operated to effect a sudden local reduction in brake pipe pressure, which causes the emergency valve device 5 to operate on the caboose, and due to a quick serial action on all the cars throughout the train, so as to effect a high pressure emergency application of the brakes.

The delay in initiating an emergency application on the rear car is introduced for the reason that in case an emergency application is started from the forward end of the train, an emergency application will not be started at the same time at the rear of the train, which might cause the train to be pulled apart by the drag of the brakes as applied at the rear of the train.

With the switch 79 in the position shown in Fig. 1, current is supplied to the train wire 75 both forward of and to the rear of the locomotive, so that the locomotive can be placed anywhere in the train and still permit the control of the brakes throughout the train.

In case of double heading, where another locomotive is in control of the train, the switch 79 is shifted to its other position, in which the source of current is cut out and the locomotive train wire is merely connected into circuit with the train wire of the other vehicles. In this case, the apparatus is operated on the locomotive, the same as on other vehicles from another locomotive on which the brake control is cut in.

If it is desired to control the brakes pneumatically, the rheostat controller is first moved so as to effect a service application of the brakes by operation of the magnets 6. Fluid under pressure is then supplied to piston chamber 30 as well as to the brake cylinder. The brake pipe pressure is then reduced in the usual manner to effect a light service application of the brakes and the triple valve piston 15 is thus shifted to service position.

In service position, passage 33 is connected through cavity 116 with an exhaust port 117. Fluid under pressure is thus vented from piston chamber 32 and since piston chamber 30 is supplied with fluid under pressure, the pistons 25 and 26 will be shifted to the right, moving the slide valve 28, so that communication between passages 31 and 100 is cut off, and causing cavity 101 to connect passage 100 with passage 118.

The movement of slide valve 28 also connects passage 91 through cavity 119 with an exhaust port 120, so that fluid is vented from the quick action chamber 50 and from the valve chamber 37. Since the valve chamber 37 is thus held at atmospheric pressure, the emergency valve device 5 is cut out of action so long as the brakes are being controlled pneumatically.

After the change-over valve device has been shifted to its right hand position, as above described, the usual brake valve may be moved to release or running position so as to shift the triple valve device to release position and release the brakes as well as recharge the system with fluid under pressure. The brakes may thereafter be controlled pneumatically in the usual manner.

Having now described my invention, what I claim as new and desire to secure by Letters Patent, is:—

1. In an electro-pneumatic brake, the combination with means on the cars of a train for effecting a service application of the brakes electrically, of electrically controlled means carried only by the vehicle at the rear of the train for initiating an emergency application of the brakes throughout the train.

2. In an electro-pneumatic brake, the combination with electro-pneumatic means on the cars of a train for effecting a service application of the brakes, of electrically controlled means carried only by the vehicle at the rear end of the train and operative upon failure of current for effecting a pneumatic emergency application of the brakes throughout the train.

3. In an electro-pneumatic brake, the combination with electro-penumatic means on the cars of a train for controlling the brakes, a train wire for supplying current to said means, of electrically controlled means at the rear of the train operative upon grounding the train wire for effecting an emergency application of the brakes throughout the train.

4. In an electro-pneumatic brake, the combination with electrically controlled means on cars of a train operative to effect a service application of the brakes, of electrically controlled means on the rear car only and operative to effect an emergency application of the brakes, and means for delaying the operation of said rear car electrically controlled means.

5. In an electro-pneumatic brake, the combination with electrically controlled means on cars of a train operative to effect a service application of the brakes, of a brake pipe, a vent valve device on the rear car operative to effect a sudden reduction in brake pipe pressure, and electrically controlled means for operating said vent valve device.

6. In an electro-pneumatic brake, the combination with electrically controlled means on cars of a train operative to effect a service application of the brakes, of a brake pipe, a vent valve device on the rear car operative to effect a sudden reduction in brake pipe pressure, electrically controlled means for effecting the operation of said vent valve device, and means for delaying the operation of said vent valve device by said electrically controlled means.

7. In an electro-pneumatic brake, the combination with a brake pipe and a vent valve device operative to vent fluid under pressure from said brake pipe, of a timing reservoir, a controlling valve device operative upon a predetermined reduction in pressure in said timing reservoir for effecting the operation of said vent valve device, and a magnet valve device for effecting the operation of said controlling valve device.

8. In an electro-pneumatic brake, the combination with a brake pipe and a vent valve device operative to vent fluid under pressure from said brake pipe, of a timing reservoir, a controlling valve device operative upon a predetermined reduction in pressure in said timing reservoir for effecting the operation of said vent valve device, and a magnet valve device on the rear car only, for effecting the operation of said controlling valve device.

9. In an electro-penumatic brake, an electrically controlled apparatus on the locomotive comprising an electric train wire, a source of current, means for controlling the current in said wire, electrically controlled means for controlling the brakes, and a switch device having one position in which said source of current is connected to said train wire and another position in which said source is cut off from said train wire.

10. In an electro-penumatic brake, an electrically controlled apparatus on the locomotive comprising an electric train wire, a source of current, means for controlling the current in said wire, electrically controlled means for controlling the brakes, and a switch device having one position in which said source of current is connected to said train wire and another position in which said source is cut off from said train wire and in which the train wire circuit is completed both toward the front and the rear of the locomotive.

11. In an electro-pneumatic brake, an electrically controlled apparatus on the locomotive comprising an electric train wire, a source of current, means for controlling the supply of current from said source to said wire, electrically controlled means connected to said wire for controlling the brakes, a cut-out cock for controlling the fluid pressure supply to said electrically controlled means, and a switch device operated with said cut-out cock for controlling the train line circuit.

12. In an electro-pneumatic brake, the combination with a source of fluid under pressure and a train wire, of electrically controlled means connected to said train wire for controlling the supply of fluid from said source for effecting an application of the brakes, a cut-out cock having one position for connecting said source of fluid under pressure to said electrically controlled means and another position in which said source is cut off from said means, the movement of said cock from the first to the second mentioned position being adapted to open the train wire circuit.

13. In an electro-pneumatic brake, the combination with a source of fluid under pressure and a brake cylinder, of electrically controlled means for controlling the supply of fluid from said source to the brake cylinder, a brake pipe, a valve device for venting fluid from the brake pipe, and electrically controlled means for controlling the operation of said valve device.

In testimony whereof I have hereunto set my hand.

THOMAS H. THOMAS.